(12) United States Patent
Park

(10) Patent No.: US 11,567,773 B2
(45) Date of Patent: Jan. 31, 2023

(54) MEMORY CONTROLLER AND MEMORY SYSTEM FOR GENERATING INSTRUCTION SET BASED ON NON-INTERLEAVING BLOCK GROUP INFORMATION

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 225 days.

(21) Appl. No.: 16/745,810

(22) Filed: Jan. 17, 2020

(65) Prior Publication Data

US 2021/0011725 A1 Jan. 14, 2021

(30) Foreign Application Priority Data

Jul. 11, 2019 (KR) ......................... 10-2019-0084083

(51) Int. Cl.
  *G06F 9/312* (2018.01)
  *G06F 9/30* (2018.01)
  *G06F 9/38* (2018.01)

(52) U.S. Cl.
  CPC .......... *G06F 9/3017* (2013.01); *G06F 9/3836* (2013.01)

(58) Field of Classification Search
  CPC ...... G06F 9/3017; G06F 9/3836; G06F 12/00; G11C 7/22
  See application file for complete search history.

(56) References Cited

U.S. PATENT DOCUMENTS

| 2015/0012802 A1* | 1/2015 | Avila ................. | G11C 16/3418 |
| | | | 714/773 |
| 2018/0151251 A1* | 5/2018 | Oh ......................... | G11C 29/76 |
| 2020/0090754 A1* | 3/2020 | Asaoka ................. | G11C 16/08 |
| 2020/0125294 A1* | 4/2020 | Parker ................... | G06F 3/0604 |

FOREIGN PATENT DOCUMENTS

| KR | 20030039644 A | * | 5/2003 |
| KR | 10-2017-0032502 | | 3/2017 |

OTHER PUBLICATIONS

Wiktionary.org, "Configurator", May 2017, 2 pages.*
Congming Gao et al., "Parallel all the time: Plane Level Parallelism Exploration for High Performance SSDs", 2019 35th Symposium on Mass Storage Systems and Technologies (MSST), May 2019, pp. 172-184.*

* cited by examiner

*Primary Examiner* — David J. Huisman
(74) *Attorney, Agent, or Firm* — IP&T Group LLP

(57) ABSTRACT

Embodiments of the present invention include a memory controller including a buffer memory configured to store program data, an instruction set configurator configured to configure an instruction set describing a procedure for programming the program data stored in the buffer memory to target memory blocks, an instruction set performer configured to sequentially perform instructions in the instruction set and generate an interrupt at a time of completion of performance of a last instruction among the instructions, and a central processing unit configured to erase the program data stored in the buffer memory when the interrupt is received from the instruction set performer. The instruction set configurator may configure the instruction set differently according to whether a non-interleaving block group exists among the target memory blocks.

1 Claim, 16 Drawing Sheets

FIG. 9

| Descriptor |
|---|
| 1. Data In/pDATA(1-2)/Die1/SB1 |
| 2. Tprog/Die 1 |
| 3. Data In/pDATA(3-4)/Die2/SB1 |
| 4. Tprog/Die 2/ITR |

MEMORY CONTROLLER AND MEMORY SYSTEM FOR GENERATING INSTRUCTION SET BASED ON NON-INTERLEAVING BLOCK GROUP INFORMATION

CROSS-REFERENCE TO RELATED APPLICATION

The present application claims priority under 35 U.S.C. § 119(a) to Korean patent application number 10-2019-0084083, filed on Jul. 11, 2019, the entire disclosure of which is incorporated herein by reference in its entirety.

BACKGROUND

Field of Invention

The present disclosure relates to a memory controller and a memory system including the same, and more particularly, to a memory controller for performing a program operation and a memory system including the same.

Description of Related Art

A memory system may include a memory controller and a memory device.

In response to a program request, a logical address, and data are received from a host, the memory controller may allocate a physical address corresponding to the received logical address, and may control the memory device so that data is stored in the allocated physical address.

SUMMARY

Embodiments of the present disclosure provide a memory controller and a memory system including the memory controller capable of enabling completion of a program operation.

A memory controller according to an embodiment of the present disclosure may include a buffer memory configured to store program data, an instruction set configurator configured to configure an instruction set describing a procedure for programming program data stored in the buffer memory to target memory blocks, an instruction set performer configured to sequentially perform instructions in the instruction set and generate an interrupt at a time of completion of performance of a last instruction among the instructions and a central processing unit configured to erase the program data stored in the buffer memory when the interrupt is received from the instruction set performer, wherein the instruction set configurator configures the instruction set differently according to whether a non-interleaving block group exists among the target memory blocks.

A memory system according to an embodiment of the present disclosure may include a first die including a non-interleaving block group, a second die including an interleaving block group and a memory controller configured to, transmit first partial data of first data from a buffer memory to the first die to program the first partial data into the non-interleaving block group, transmit, after transmitting the first partial data, second data from the buffer memory to the second die to program the second data into the interleaving block group, transmit, after transmitting the second data, second partial data of the first data from the buffer memory to the first die to program the second partial data into the non-interleaving block group, and erase, after transmitting the second partial data, the first and second data stored in the buffer memory.

A memory system according to an embodiment of the present disclosure may include a memory device including first and second dies sharing a single channel, the first die including first and second memory blocks within a single plane of the first die, and the second die including a group of memory blocks within different planes of the second die, a buffer configured to buffer first to third pieces of data and a controller configured to, control the memory device to perform a program operation of sequentially storing the first to third pieces of data respectively into the first memory block, the group of memory blocks and the second memory block and remove the first to third pieces of data from the buffer upon completion of the program operation, wherein the program operation is performed on the group of memory blocks according to a plane interleaving scheme.

According to embodiments of the present invention, since program data stored in the buffer memory may be erased quickly within a limit that enables completion of a program operation, a capacity of the buffer memory may be quickly secured.

BRIEF DESCRIPTION OF THE DRAWINGS

FIG. 9 is a diagram illustrating a descriptor.

DETAILED DESCRIPTION

Figure 1:
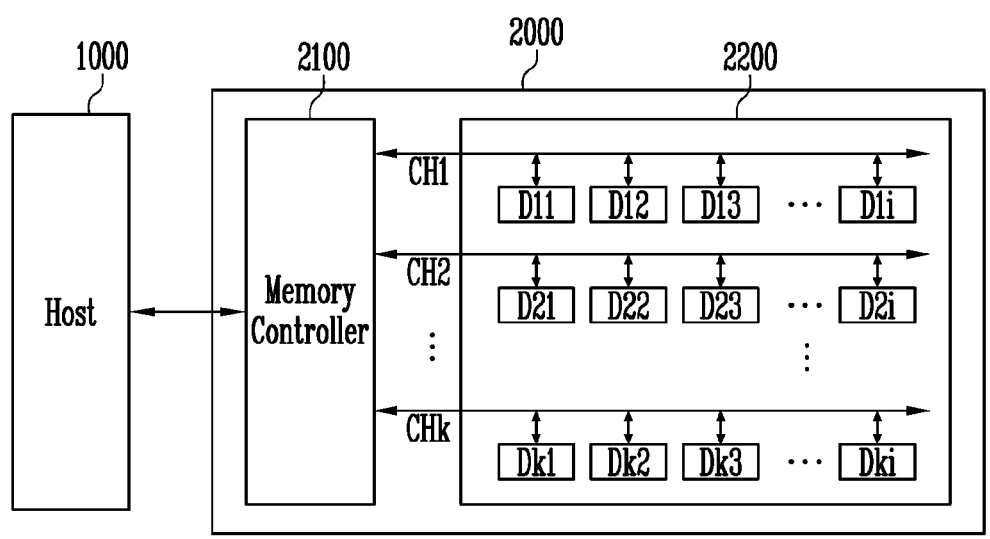
FIG. 1 is a diagram illustrating a memory system according to an embodiment of the present disclosure.

Referring to FIG. 1, a memory system 2000, according to an embodiment of the present disclosure, may include a memory device 2200 in which data is stored and a memory controller 2100 controls the memory device 2200 according to a request of a host 1000.

The host 1000 may be any suitable device or system that stores data in the memory system 2000 or retrieves data from the memory system 2000. For example, the host 1000 may include a computer, a portable digital device, a tablet, a digital camera, a digital audio player, a television, a wireless communication device, and/or a cellular phone, but embodiments of the present disclosure are not limited thereto.

The memory controller 2100 may control overall operations of the memory system 2000. The memory controller 2100 may perform various operations according to a request from the host 1000. For example, the memory controller 2100 may perform a program operation, a read operation, an erase operation, or the like on the memory device 2200. During the program operation, the memory controller 2100 may transmit a program command, an address, data, and the like to the memory device 2200. During the read operation, the memory controller 2100 may transmit a read command, an address, and the like to the memory device 2200 and receive read data from the memory device 2200. During the erase operation, the memory controller 2100 may transmit an erase command, an address, and the like to the memory device 2200.

The memory device 2200 may perform the program operation, the read operation, the erase operation, and the like under control of the memory controller 2100. The memory device 2200 may include one or more dies, e.g., dies D11 to D1i, D21 to D2i, and Dk1 to Dki. k and i are natural numbers. For example, each of the dies D11 to D1i, D21 to D2i, and Dk1 to Dki may be implemented as a volatile memory device in which stored data is lost when power supply is cut off, or as a non-volatile memory device in which stored data is retained even when the power supply is cut off. For example, the dies D11 to D1i, D21 to D2i, and Dk1 to Dki may be NAND flash memory devices.

The dies D11 to D1i, D21 to D2i, and Dk1 to Dki may be connected to the controller 2100 through a plurality of channels CH1 to CHk. For example, the dies D11 to D1i may be connected to the first channel CH1, the dies D21 to D2i may be connected to the second channel CH2, and the dies Dk1 to Dki may be connected to the k-th channel CHk.

Each of the dies D11 to D1i, D21 to D2i, and Dk1 to Dki may receive a program command, an address, and data from the memory controller 2100, and store data according to the program command and the address. Each of the dies D11 to D1i, D21 to D2i, and Dk1 to Dki may perform the read operation according to the read command and the address received from the memory controller 2100, and may provide read data to the memory controller 2100. Each of the dies D11 to D1i, D21 to D2i, and Dk1 to Dki may perform the erase operation according to an erase command and an address received from the memory controller 2100.

Figure 2:
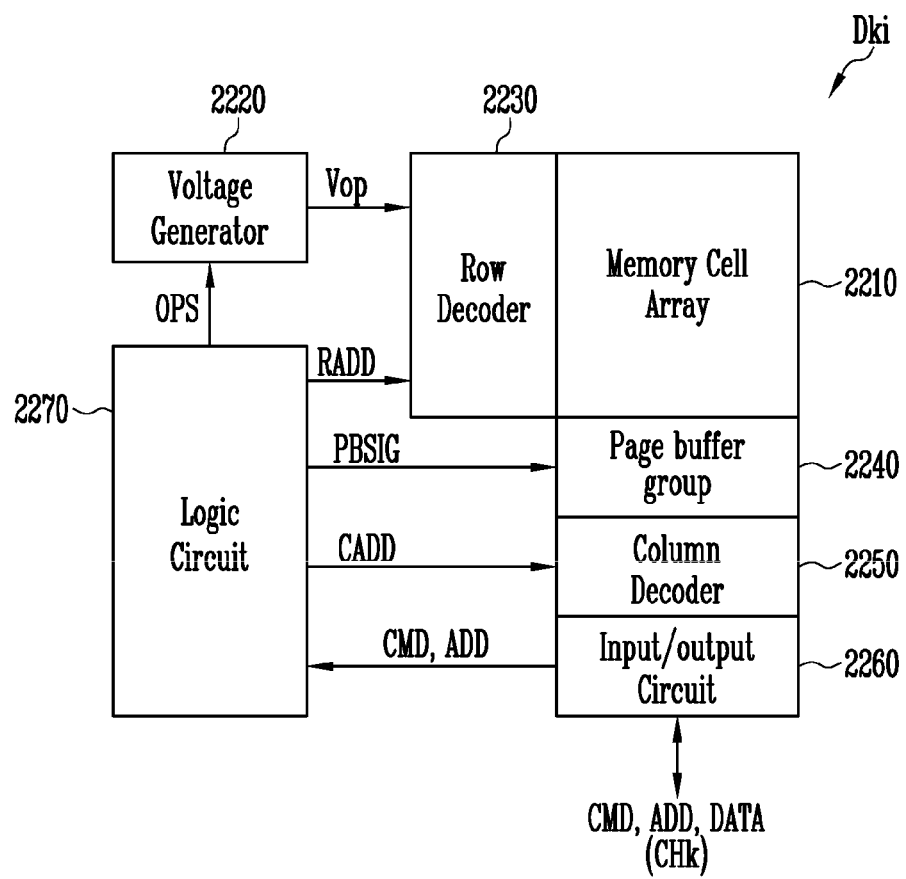
FIG. 2 is a diagram illustrating exemplary components of a representative die of dies shown in FIG. 1.

FIG. 2 is a diagram illustrating a configuration of a representative die of the dies shown in FIG. 1.

Referring to FIG. 2, a die Dki may include a memory cell array 2210 in which data is stored, and a peripheral circuit that includes a voltage generator 2220, a row decoder 2230, a page buffer group 2240, a column decoder 2250, and an input/output circuit 2260 for performing a program, read, or erase operation, and control logic 2270 that controls the peripheral circuit.

The memory cell array 2210 may include a plurality of planes. Each of the planes may include a plurality of memory blocks in which data is stored. Each of the memory blocks may include a plurality of memory cells. The memory cells may be implemented in a two-dimensional structure in which the memory cells are arranged in parallel to a substrate or in a three-dimensional structure in which the memory cells are stacked on the substrate in a vertical direction. The memory cell array 2210 will be described in more detail with reference to FIGS. 3 and 4.

The voltage generator 2220 may generate operation voltages Vop necessary for various operations in response to an operation signal OPS. For example, the operation voltage Vop may include a program voltage, a verify voltage, a read voltage, a pass voltage, and/or an erase voltage. The voltage generator 2220 may output the generated operation voltage Vop to the row decoder 2230.

The row decoder 2230 may transmit the operation voltage Vop through local lines connected to a memory block selected according to a row address RADD among memory blocks included in the memory cell array 2210.

The page buffer group 2240 may include a plurality of page buffers connected to bit lines. The page buffer group 2240 may include page buffers or multi-level buffers corresponding to the planes included in the die Dki, respectively. The page buffers or the multi-level buffers may temporarily store data during program, read, and verify operations in response to a control signal PBSIG. Each of the page buffers or the multi-level buffers may include a plurality of latches for temporarily storing data during the program, read, and verify operations. The page buffer group 2240 is described in more detail with reference to FIGS. 3 and 4.

The column decoder 2250 may transfer data received from the input/output circuit 2260 to the page buffer group 2240 in response to a column address CADD during the program operation, or may transfer data receive from the page buffer group 2240 to the input/output circuit 2260 during the read operation.

The input/output circuit 2260 may be connected to the controller 2100 of FIG. 1 through input/output lines included in the channel CHk to input/output a command CMD, an address ADD, and data DATA. For example, during the program operation, the input/output circuit 2260 may transmit the command CMD and the address ADD received from the controller 2100 to the control logic 2270, and may transmit the data DATA to the column decoder 2250. The address ADD input to the input/output circuit 2260 may be a physical address output by the controller 2100. For example, during the read operation, the input/output circuit 2260 may output the data DATA received from the column decoder 2250 to the controller 2100 through the input/output lines.

The control logic 2270 may control the peripheral circuit and its individual components 2220, 2230, 2240, 2250, and 2260 in response to the command CMD and the address ADD received through the input/output circuit 2260. The control logic 2270 may generate the operation signal OPS and the control signal PBSIG in response to the command CMD, and may generate the row address RADD and the column address CADD in response to the address ADD. The row address RADD may be output to the row decoder 2230, and the column address CADD may be output to the column decoder 2250.

Figure 3:
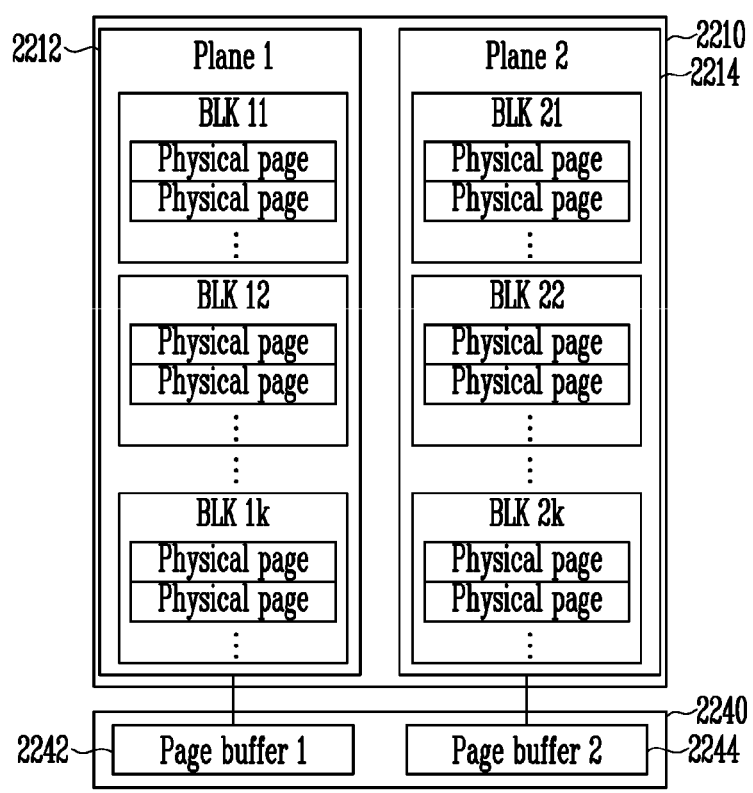
FIGS. 3 and 4 are diagrams illustrating a memory cell array and a page buffer group shown in FIG. 2.

FIG. 3 is a diagram illustrating the memory cell array and the page buffer group shown in FIG. 2.

The memory cell array 2210 may include a plurality of planes. In FIG. 3, an example in which two planes, that is, a Plane 1 2212 and a Plane 2 2214 are included in the memory cell array 2210 is shown, but embodiments of the present disclosure are not limited thereto. For example, three or more planes may be included in the memory cell array 2210.

Each of the planes 2212 and 2214 may include a plurality of memory blocks. In FIG. 3, k memory blocks BLK 11 to BLK 1k and BLK 21 to BLK 2k are included in the planes 2212 and 2214, respectively, where k is an integer of 2 or more. While FIG. 3 shows that each of the planes 2212 and 2214 have the same number of memory blocks, the present invention is not limited to that configuration; the planes need not have the same number of memory blocks in all embodiments.

Each of the memory blocks BLK 11 to BLK 1k and BLK 21 to BLK 2k may include a plurality of physical pages. Each of the memory blocks may or may not have the same number of pages. Each of the physical pages may include a plurality of memory cells.

Each of the physical pages may include one logical page. For example, when the memory blocks BLK 11 to BLK 1k and BLK 21 to BLK 2k are SLC blocks operating in a single-level cell (SLC) mode, each of the physical pages in the memory blocks BLK 11 to BLK 1k and BLK 21 to BLK 2k may include one logical page.

The page buffer group 2240 may include page buffers corresponding to each of the planes included in the memory cell array 2210. For example, when the two planes 2212 and 2214 are included in the memory cell array 2210, the page buffer group 2240 may include a page buffer 1 2242 corresponding to the Plane 1 2212 and a page buffer 2 2244 corresponding to the Plane 2 2214.

Each of the page buffers 2242 and 2244 may store one logical page data. One logical page data may include as many data bits as the number of memory cells included in one physical page.

The logical page data stored in the page buffer 1 2242 may be programmed in a physical page in any one of the memory blocks BLK 11 to BLK 1k in the Plane 1 2212, and the logical page data stored in the page buffer 2 2244 may be programmed in a physical page in any one of the memory blocks BLK 21 to BLK 2k in the Plane 2 2214. When a plane interleaving method is used during the program operation, the logical page data stored in the page buffer 1 2242 and the logical page data stored in the page buffer 2 2244 may be simultaneously programmed.

Figure 4:
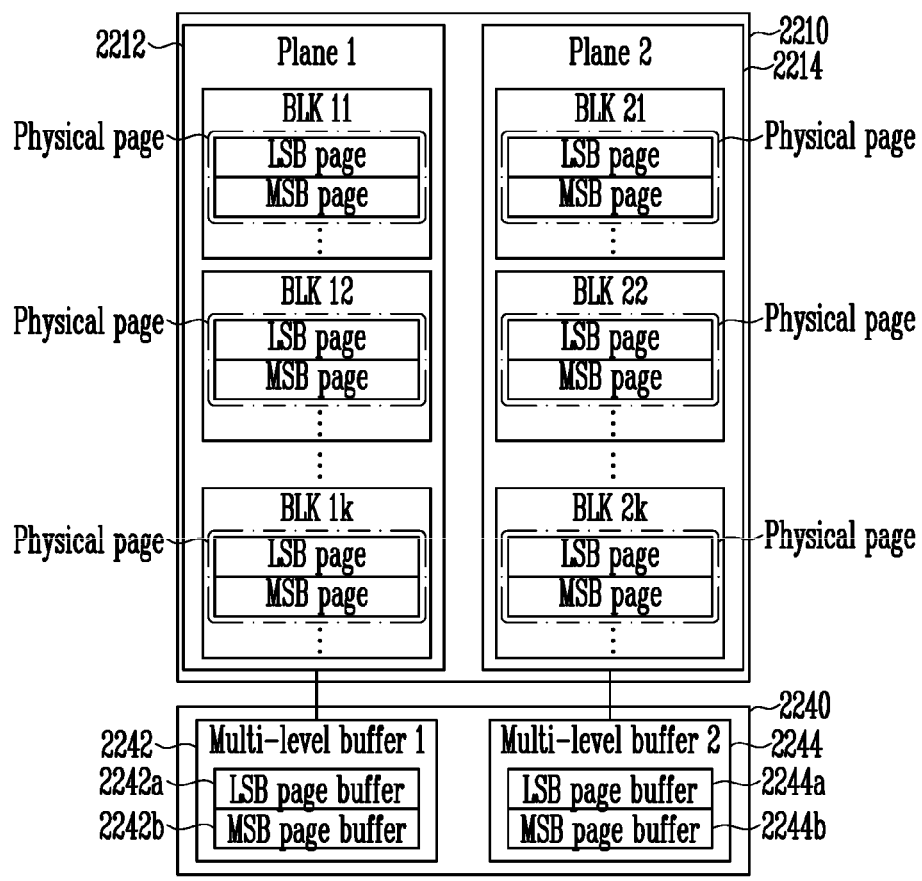

FIG. 4 is a diagram illustrating examples of the memory cell array and the page buffer group shown in FIG. 2.

The memory cell array 2210 may include a plurality of planes. In FIG. 4, an example in which two planes, that is, a Plane 1 2212 and a Plane 2 2214 are included in the memory cell array 2210 is shown, but embodiments of the present disclosure are not limited thereto. For example, three or more planes may be included in the memory cell array 2210.

Each of the planes 2212 and 2214 may include a plurality of memory blocks. In FIG. 4, k memory blocks BLK 11 to BLK 1k and BLK 21 to BLK 2k are included in the planes 2212 and 2214, respectively, where k is an integer of 2 or more. While FIG. 4 shows that each of the planes 2212 and 2214 have the same number of memory blocks, the present invention is not limited to that configuration; the planes need not have the same number of memory blocks in all embodiments.

Each of the memory blocks BLK 11 to BLK 1k and BLK 21 to BLK 2k may include a plurality of physical pages. Each of the memory blocks may or may not have the same number of pages. Each of the physical pages may include a plurality of memory cells.

Each of the physical pages may include a plurality of logical pages. For example, when the memory blocks BLK 11 to BLK 1k and BLK 21 to BLK 2k are m-bit MLC blocks operating in an m-bit multi-level cell (MLC) mode, each of the physical pages in the memory blocks BLK 11 to BLK 1k and BLK 21 to BLK 2k may include m logical pages, where m is a natural number. In FIG. 4, as an example, a case where the memory blocks BLK 11 to BLK 1k and BLK 21 to BLK 2k are 2-bit MLC blocks, that is, each of the memory blocks BLK 11 to BLK 1k and BLK 21 to BLK 2k includes two logical pages (a least significant bit (LSB) page and a most significant bit (MSB) page) is shown, but embodiments of the present disclosure are not limited thereto. For example, the memory blocks BLK 11 to BLK 1k and BLK 21 to BLK 2k may be 3-bit MLC blocks (which may be referred to as TLC blocks) or 4-bit MLC blocks (which may be referred to as QLC blocks).

The page buffer group 2240 may include page buffers corresponding to the planes included in the memory cell array 2210, respectively. For example, when the two planes 2212 and 2214 are included in the memory cell array 2210, the page buffer group 2240 may include a page buffer 1 2242 corresponding to the Plane 1 2212 and a page buffer 2 2244 corresponding to the Plane 2 2214.

Each of the page buffers 2242 and 2244 may include a plurality of logical page buffers. In FIG. 4, as an example, the page buffer 2242 includes two logical page buffers, that is, an LSB page buffer 2242a and an MSB page buffer 2242b and the page buffer 2244 includes two logical page buffers, that is, an LSB page buffer 2244a and an MSB page buffer 2244b, but embodiments of the present disclosure are limited thereto. For example, when the memory blocks BLK 11 to BLK 1k and BLK 21 to BLK 2k are m-bit MLC blocks, each of the page buffers 2242 and 2244 may include m logical page buffers for the m logical pages. For example, when the memory blocks BLK 11 to BLK 1k and BLK 21 to BLK 2k are 3-bit MLC blocks, each of the page buffers 2242 and 2244 may include three logical page buffers, and when the blocks BLK 11 to BLK 1k and BLK 21 to BLK 2k are 4-bit MLC blocks, each of the page buffers 2242 and 2244 may include four logical page buffers.

Each of the logical page buffers 2242a, 2242b, 2244a, and 2244b may store one logical page data. For example, each of the logical page buffers 2242a and 2244a may store LSB page data, and each of the logical page buffers 2242b and 2244b may store MSB page data. One logical page data may include the same number of data bits as there are memory cells in one physical page.

The plurality of pieces of logical page data (LSB page data and MSB page data) stored in the page buffer 1 2242 may be programmed in a physical page in any of the memory blocks BLK 11 to BLK 1k in the Plane 1 2212, and the plurality of pieces of logical page data (LSB page data and MSB page data) stored in the page buffer 2 2244 may be programmed in a physical page in any of the memory blocks BLK 21 to BLK 2k in the Plane 2 2214. When a plane interleaving method is used during the program operation, the pieces of the logical page data stored in the page buffer 1 2242 and the pieces of the logical page data stored in the page buffer 2 2244 may be simultaneously programmed.

In the following description, it is assumed that the memory blocks are SLC blocks, but the embodiments of the present disclosure may be equally applied to the case where the memory blocks are m-bit MLC blocks.

Figure 5:
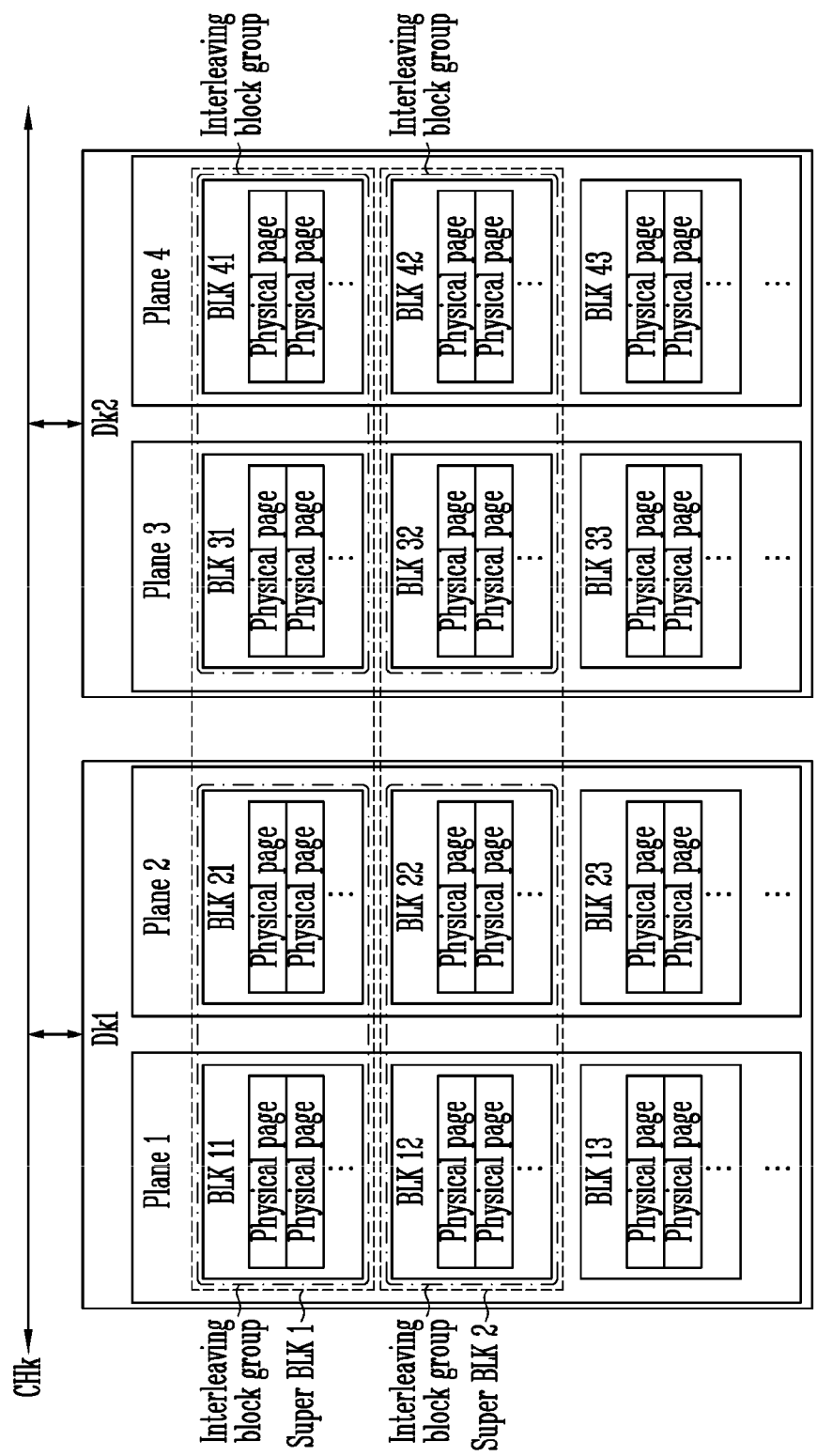
FIG. 5 is a diagram illustrating a super block and an interleaving block group.

FIG. 5 is a diagram illustrating a super block and an interleaving block group.

In FIG. 5, as an example, dies Dk1 and Dk2 connected to the channel CHk are shown among the dies shown in FIG. 1.

The memory controller 2100 may configure a super block by logically connecting memory blocks in the plurality of dies Dk1 and Dk2 in order to improve parallel processing performance of the memory system 2000.

As an example, one super block may include one memory block per plane in each of the dies Dk1 and Dk2. For example, a memory block BLK 11 in Plane 1 of the die Dk1, a memory block BLK 21 in Plane 2 of the die Dk1, a memory block BLK 31 in Plane 3 of the die Dk2, and a memory block BLK 41 in Plane 4 of the die Dk2 may configure one super block, Super BLK1. In the same principle, another super block, Super BLK2, may be configured.

The memory blocks BLK 13, BLK 23, BLK 33, and BLK 43 may be used to replace a bad memory block among memory blocks in the super blocks.

The dies Dk1 and Dk2 may operate in a die interleaving method. That is, the dies Dk1 and Dk2 may operate in parallel with each other. For example, the program operation may be performed on the die DK2 while the program operation is performed on the die Dk1.

Each of the super blocks super BLK 1 and super BLK 2 may include interleaving block groups. Each of the interleaving block groups may include as many memory blocks as the number of planes included in one die, and may include one of the memory blocks included in each of the planes. That is, each of the interleaving block groups may include memory blocks included in different planes among memory blocks included in the same die. For example, the memory block BLK 11 included in Plane 1 of the die Dk1 and the memory block BLK 21 included in Plane 2 of the die Dk1 may configure one interleaving block group.

The memory blocks included in the same interleaving block group may operate in a plane interleaving method. That is, the program operation may be performed in parallel on the memory blocks included in the same interleaving block group. For example, the program operation may be simultaneously performed on the memory block BLK 11 and the memory block BLK 21 included in the same interleaving block group.

Figure 6:
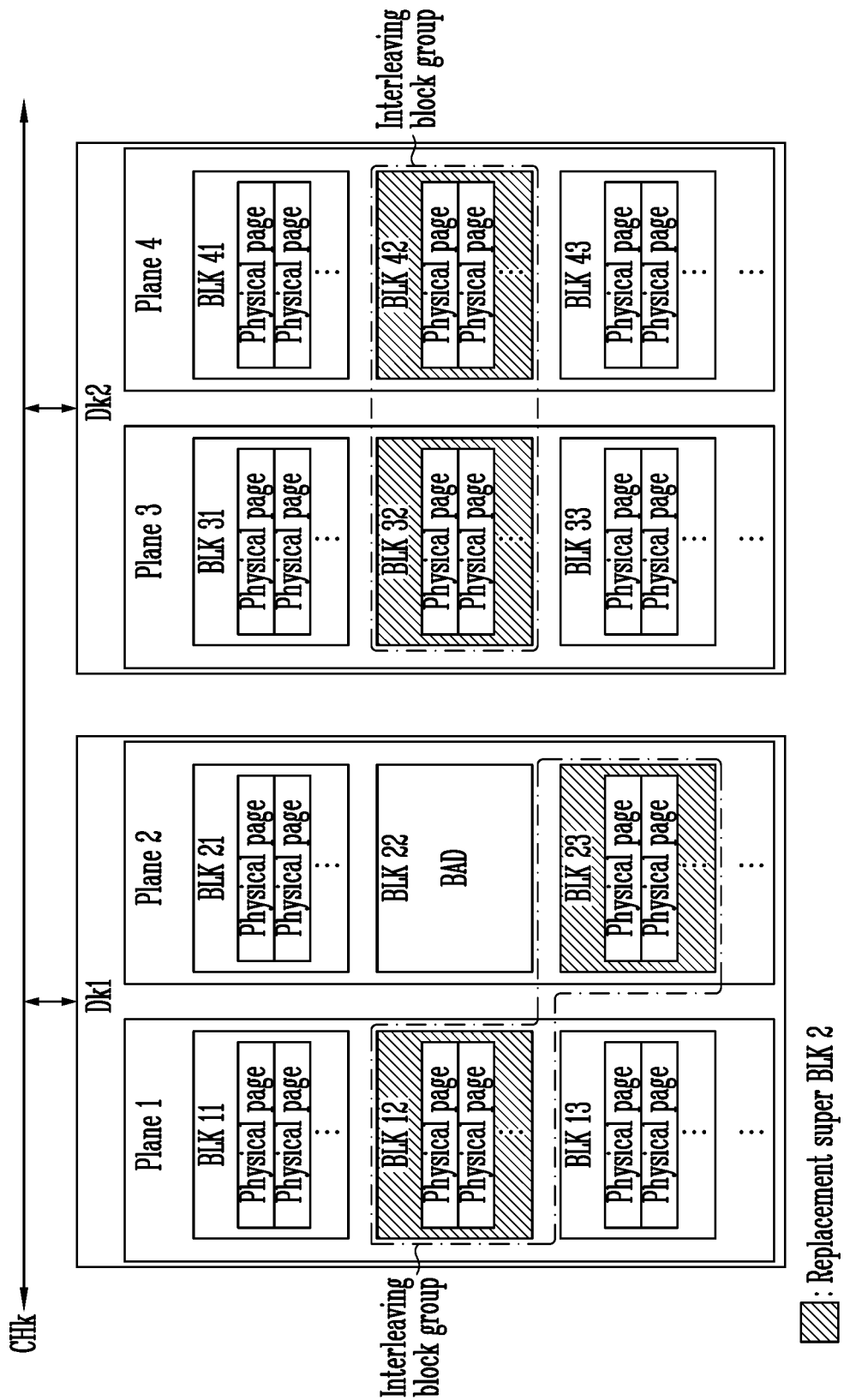
FIGS. 6 and 7 are diagrams illustrating a replacement super block and a non-interleaving block group.
Figure 7:
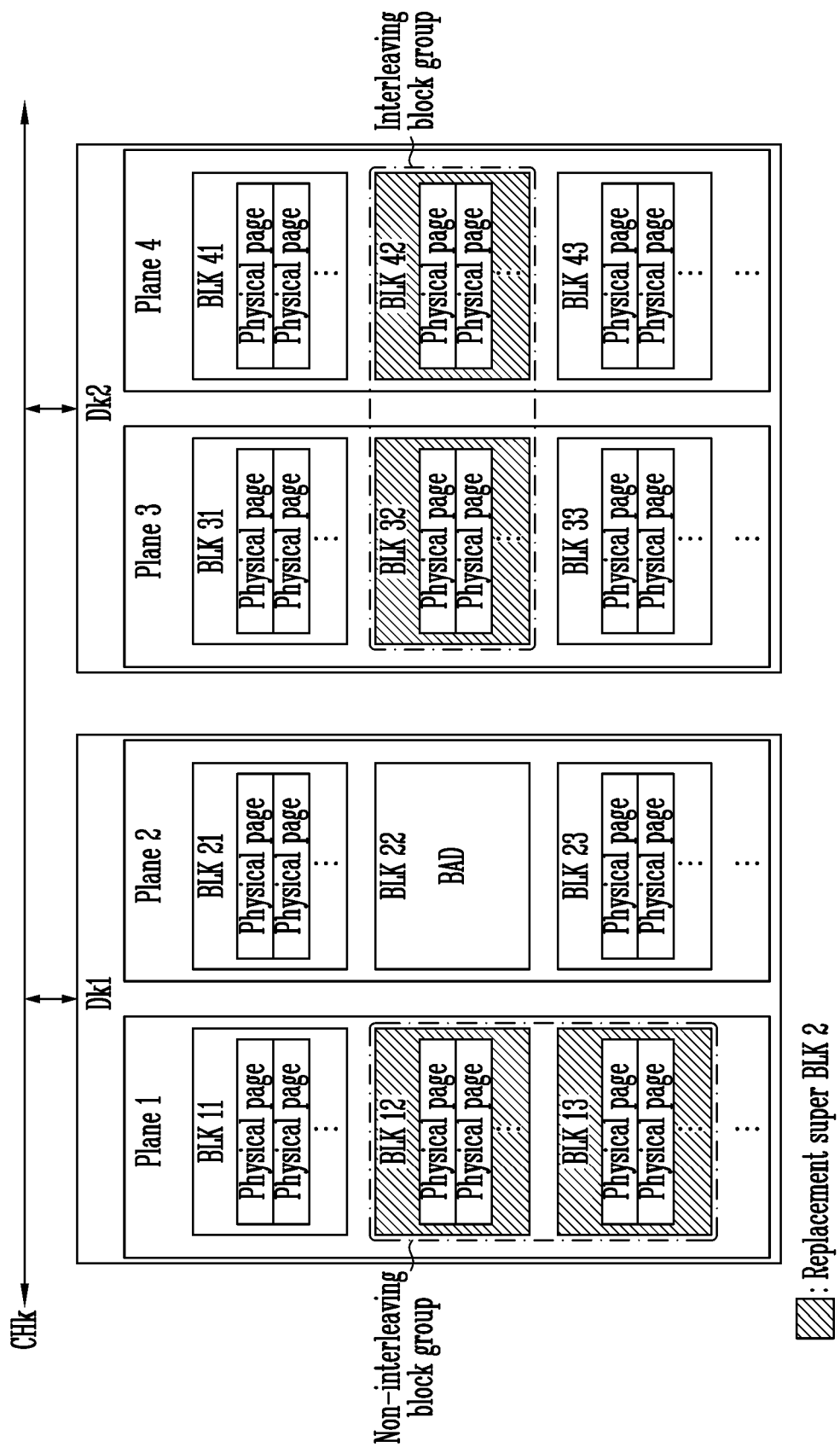

FIGS. 6 and 7 are diagrams illustrating a replacement super block and a non-interleaving block group.

When a bad memory block occurs among the memory blocks configuring the super block, the memory controller 2100 replaces the bad memory block with one of the memory blocks included in the same die as the bad memory block to configure the replacement super block. The memory block that replaces the bad memory block may be referred to as a replacement memory block.

In an embodiment, the memory controller 2100 may replace the bad memory block in one plane with a replacement memory block in the same plane. In such a case, the interleaving block group may be maintained. An example of a case where the interleaving block group is maintained is shown in FIG. 6.

In FIG. 6, an example in which a replacement super block 2 (Replacement super BLK2) is generated by replacing a bad memory block BLK 22 in the die Dk1 with a replacement memory block BLK 23 is shown. In the example shown in FIG. 6, the memory block BLK 12 and the replacement memory block BLK 23 in the replacement super block 2 belong to different planes, i.e., they belong to Plane 1 and Plane 2 respectively. Therefore, the memory block BLK 12 and the replacement memory block BLK 23 may operate in the plane interleaving method, and the memory block BLK 12 and the replacement memory block BLK 23 may be referred to as the interleaving block group.

In an embodiment, the memory controller 2100 may replace the bad memory block in a plane with a replacement memory block in a different plane. In such a case, the interleaving block group may not be maintained. An example of a case where the interleaving block group is not maintained is shown in FIG. 7.

In FIG. 7, an example in which a replacement super block 2 is generated by replacing a bad memory block BLK 22 in the die Dk1 with a replacement memory block BLK 13 is shown. In the example shown in FIG. 7, the memory block BLK 12 and the replacement memory block BLK 13 in the replacement super block 2 belong to the same plane, i.e., Plane 1. Therefore, the memory block BLK 12 and the replacement memory block BLK 13 may not operate in the plane interleaving method, and the memory block BLK 12 and the replacement memory block BLK 13 may be referred to as a non-interleaving block group.

The non-interleaving block group may include as many memory blocks as there are planes in one die, and the memory blocks included in the non-interleaving block group may belong to the same plane.

Figure 8:
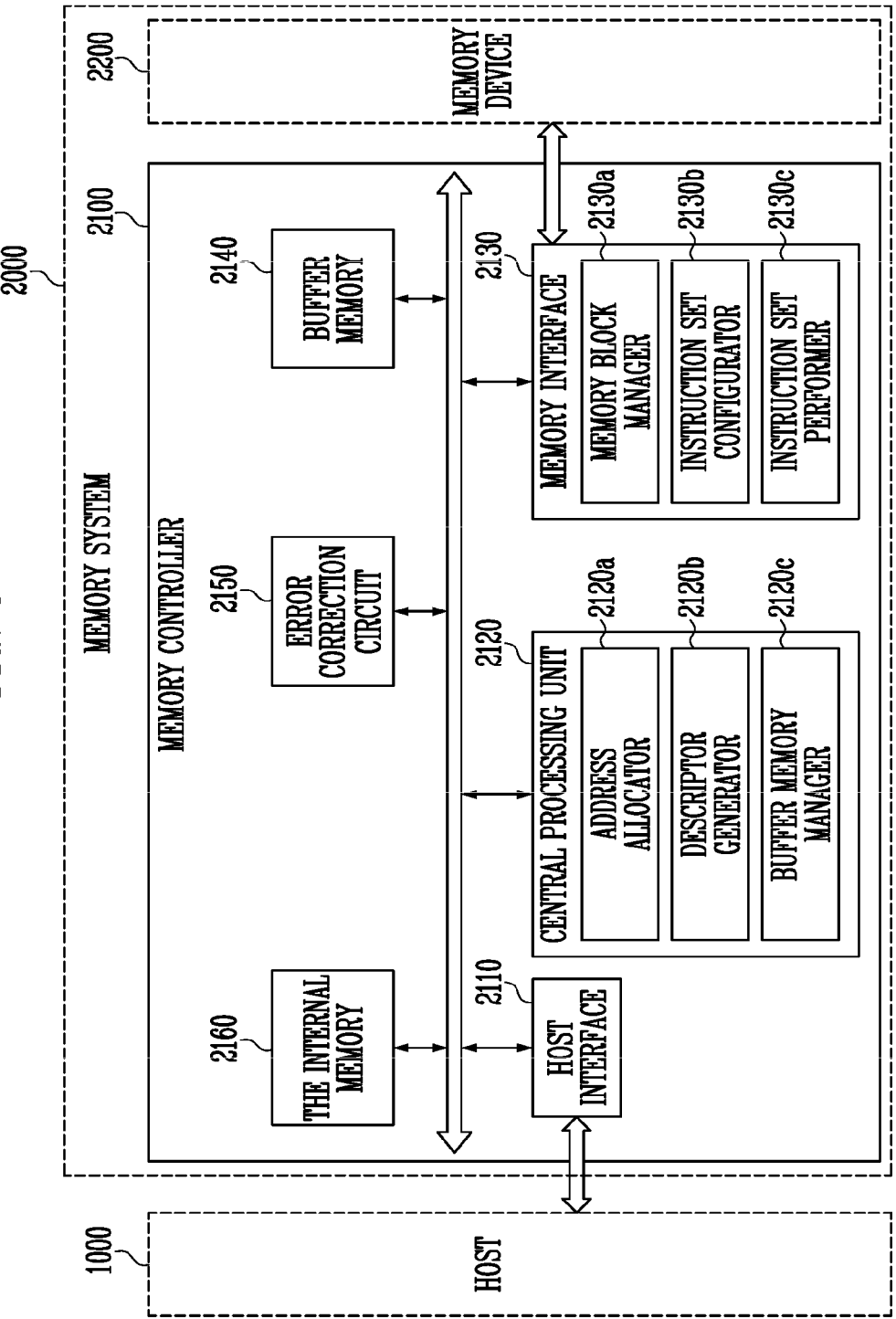
FIG. 8 is a diagram illustrating a memory controller shown in FIG. 1.

FIG. 8 is a diagram illustrating an example of the memory controller shown in FIG. 1.

The memory controller 2100 may include a host interface 2110, a central processing unit 2120, a memory interface 2130, a buffer memory 2140, an error correction circuit 2150, and/or an internal memory 2160. The host interface 2110, the memory interface 2130, the buffer memory 2140, the error correction circuit 2150, and the internal memory 2160 may be controlled by the central processing unit 2120.

The host interface 2110 may transfer a program request, a read request, an erase request, and the like received from the host 1000 to the central processing unit 2120. The host interface 2110 may store program data received from the host 1000 in the buffer memory 2140.

The host interface 2110 may communicate with the host 1000 using any of various interface protocols. For example, the host interface 2110 may communicate with the host 100 using a non-volatile memory express (NVMe), a peripheral component interconnect-express (PCI-E), an advanced technology attachment (ATA), a serial ATA (SATA), a parallel ATA (PATA), a universal serial bus (USB), a multi-media card (MMC), an enhanced small disk interface (ESDI), integrated drive electronics (IDE), a mobile industry processor interface (MIPI), a universal flash storage (UFS), a small computer small interface (SCSI), and/or a serial attached SCSI (SAS), but embodiments of the present disclosure are not limited thereto.

The central processing unit 2120 may include an address allocator 2120a, a descriptor generator 2120b, and a buffer memory manager 2120c.

The address allocator 2120a may determine a storage area in which program data stored in the buffer memory 2140 is to be stored, and allocate a virtual address corresponding to the determined storage area corresponding to the program data. Here, the storage area in which the program data is to be stored may correspond to one super block, and the virtual address may be information for identifying a super block. For example, the virtual address may include information on the die and/or information on the super block. The address allocator 2120a may provide the virtual address corresponding to the program data to the descriptor generator 2120b.

The descriptor generator 2120b may generate a descriptor that serves as a work order in which items of work required to program the program data stored in the buffer memory 2140 into target memory blocks (for example, one super block) are described. The descriptor may include operation information, data position information, and/or the virtual address provided from the address allocator 2120a. The descriptor generator 2120b may insert information indicating an interrupt after the last work among the work items in the descriptor. An example of the descriptor is described later with reference to FIG. 9.

The buffer memory manager 2120c may monitor the program data stored in the buffer memory 2140. In a case where enough program data is collected in the buffer memory 2140 to fill one storage area (for example, one super block), the buffer memory manager 2120c may so inform the address allocator 2120a. When an interrupt is received from the memory interface 2130, the buffer memory manager 2120c may erase the program data stored in the buffer memory 2140.

The memory interface 2130 may include a memory block manager 2130a, an instruction set configurator 2130b, and an instruction set performer 2130c.

The memory block manager 2130a may manage the super block and the replacement super block. For example, the memory block manager 2130a may manage a mapping relationship between a virtual address and a physical address. For example, the physical address may correspond to memory blocks in the super block or memory blocks included in the replacement super block.

When a bad memory block exists among the memory blocks included in the super block, the memory block manager 2130a may replace the bad memory block with the replacement memory block.

The memory block manager 2130a may manage information on whether the memory blocks in the replacement super block are an interleaving block group or a non-interleaving block group. For example, the memory block manager 2130a may manage information on which die among the memory blocks in the replacement super block is an interleaving block group or a non-interleaving block group.

The memory block manager 2130a may monitor the descriptor received from the descriptor generator 2120b and check whether the virtual address in the descriptor corresponds to the super block or the replacement super block. When the virtual address in the descriptor corresponds to the replacement super block, the memory block manager 2130a may check whether the non-interleaving block group exists in the replacement super block.

When the virtual address in the descriptor corresponds to a super block or a replacement super block that does not include a non-interleaving block group, the memory block manager 2130a may provide information indicating that a non-interleaving block group does not exist to the instruction set configurator 2130b.

When the virtual address in the descriptor corresponds to the replacement super block including the non-interleaving block group, the memory block manager 2130a may provide information indicating where the non-interleaving block group is positioned to the instruction set configurator 2130b.

The instruction set configurator 2130b may receive the descriptor from the descriptor generator 2120b and configure an instruction set based on the received descriptor. The instruction set configurator 2130b may provide the configured instruction set to the instruction set performer 2130c.

In the instruction set, the procedure required to perform the work items described in the descriptor may be described. For example, in the instruction set, instructions to program the program data stored in the buffer memory 2140 into target memory blocks (for example, the super block or the replacement super block) may be described.

The instruction set configurator 2130b may configure the instruction set differently according to whether the non-interleaving block group exists among the target memory blocks (for example, the super block or the replacement super block).

For example, it is assumed that the target memory blocks include a non-interleaving block group in a Die 1 and an interleaving block group in a Die 2. In this case, the instruction set configurator 2130b may separately configure first instructions corresponding to a first memory block among the memory blocks in the non-interleaving block group in the Die 1 and second instructions corresponding to a second memory block among the memory blocks in the non-interleaving block group in the Die 1. In addition, the instruction set configurator 2130b may configure third instructions corresponding to the interleaving block group in the Die 2 separately from the first and second instructions. The instruction set configurator 2130b may configure the instruction set such that the second instructions are positioned after, and hence performed after, the third instructions.

For example, it is assumed that the target memory blocks include a first interleaving block group in the Die 1 and a second interleaving block group in the Die 2. In this case, the instruction set configurator 2130b may separately configure instructions corresponding to the first interleaving block group and instructions corresponding to the second interleaving block group.

An example of the instruction set is described later with reference to FIGS. 10 to 12.

The instruction set performer 2130c may receive the instruction set from the instruction set configurator 2130b and sequentially perform the instructions as ordered in the received instruction set. For example, the instruction set performer 2130c may transmit a command, a physical address, and program data to dies including the target memory blocks according to the instructions described in the instruction set. In addition, when a holding instruction is included in a first instruction set corresponding to a particular die, the instruction set performer 2130c may hold performing a second instruction set also corresponding to that die such that access thereto is suspended until completion of the performing of the first instruction set.

The instruction set performer 2130c may generate and provide an interrupt to the central processing unit 2120 when performance of the last instruction among the instructions in the instruction set is completed.

The buffer memory 2140 may temporarily store data while the memory controller 2100 controls the memory device 2200. For example, the buffer memory 2140 may store the program data.

The error correction circuit 2150 may perform error correction encoding during the program operation and may perform error correction decoding during the read operation.

The internal memory 2160 may be used as storage for storing various pieces of information required for the operation of the memory controller 2100.

FIG. 9 is a diagram illustrating an example of a descriptor.

The descriptor may include operation information, data position information, and/or a virtual address.

The operation information may indicate whether an operation to be performed is a program operation, a read operation, an erase operation, or a standby operation. In FIG. 9, an example in which information Data In indicating the program operation and information Tprog indicating the standby operation is shown.

The data position information may indicate a position where the program data is stored on the buffer memory. In FIG. 9, an example in which information pDATA(1-2) as to where first data of the program data is stored and information pDATA(3-4) as to where second data of the program data is stored is shown.

The virtual address may include information corresponding to the super block and/or die. In FIG. 9, an example in which index information SB1 corresponding to the super block and index information Die 1 and Die 2 corresponding to a die is shown.

A first syntax (Data In/pDATA(1-2)/Die 1/SB1) of the descriptor may indicate an operation of transmitting the first data stored in the storage position pDATA(1-2) of the buffer memory to the super block SB 1 included in the Die 1.

A second syntax (Tprog/Die 1) of the descriptor may indicate an operation of waiting for a time during which the first data transmitted to the Die 1 is programmed.

A third syntax (Data In/pDATA(3-4)/Die 2/SB1) of the descriptor may indicate an operation of transmitting the second data stored in the storage position pDATA(3-4) of the buffer memory to the super block 1 SB1 included in the Die 2.

A fourth syntax (Tprog/Die 2/ITR) of the descriptor may indicate an operation of waiting for a time during which the second data transmitted to the Die 2 is programmed.

The fourth syntax (Tprog/Die 2/ITR) which is the last syntax of the descriptor may include information (ITR) indicating to generate an interrupt when the performance of the instruction corresponding to a corresponding syntax is completed.

Figure 10:
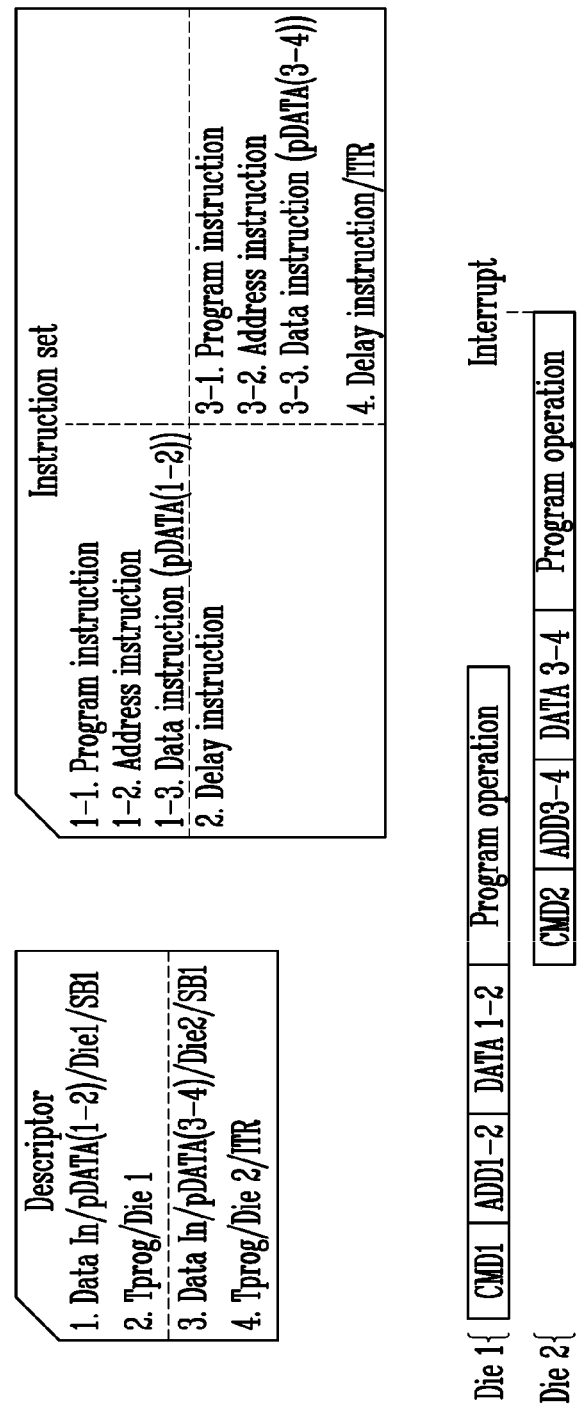
FIGS. 10 to 12 are diagrams illustrating an instruction set.

FIG. 10 is a diagram illustrating an instruction set.

FIG. 10 shows a case where there is no non-interleaving block group among the target memory blocks.

The instruction set may include instruction(s) corresponding to each syntax included in the descriptor. For example, the instruction set may include instructions 1-1, 1-2, and 1-3 corresponding to a first syntax (Data In/pDATA(1-2)/Die 1/SB1) of the descriptor, an instruction 2 corresponding to a second syntax (Tprog/Die 1) of the descriptor, instructions 3-1, 3-2, and 3-3 corresponding to a third syntax (Data In/pDATA(3-4)/Die 2/SB1) of the descriptor, and an instruction 4 corresponding to a fourth syntax (Tprog/Die 2/ITR) of the descriptor. The last instruction 4 among the instructions in the instruction set may include information (ITR) indicating to generate the interrupt when performance of the last instruction 4 is completed, as described in the descriptor.

A command CMD1, an address ADD1-2, and data DATA 1-2 may be transmitted to the Die 1 according to the instructions 1-1, 1-2, and 1-3, and the standby operation may be performed until the program operation is completed in the Die 1.

Similarly, a command CMD2, an address ADD3-4 and data DATA 3-4 may be transmitted to the Die 2 according to the instructions 3-1, 3-2, and 3-3, and the standby operation may be performed until the program operation is completed in the Die 2. The interrupt may occur when the standby operation is completed. Therefore, the program data may be erased from the buffer memory.

Figure 11:
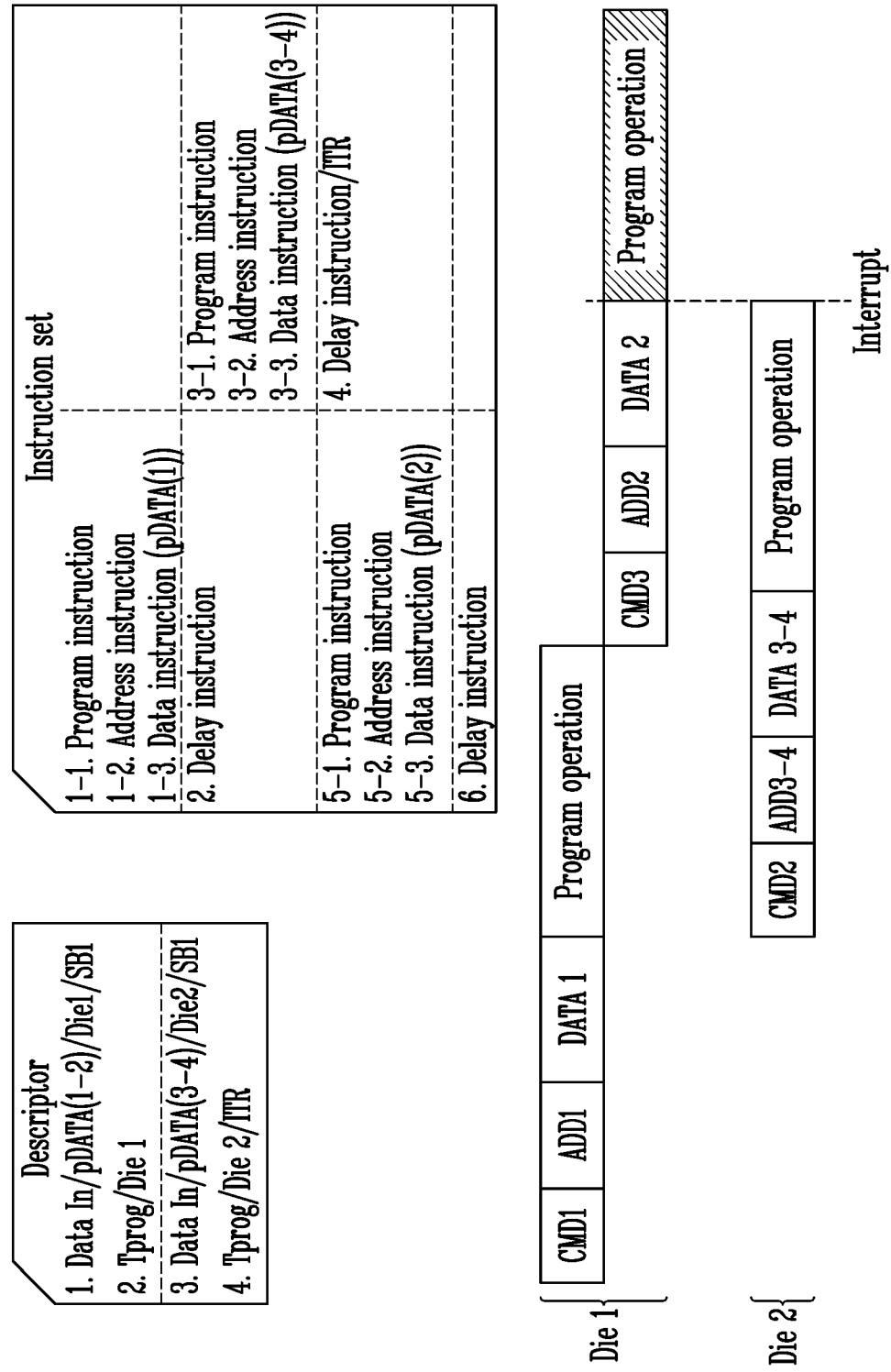

FIG. 11 is a diagram illustrating an exemplary instruction set.

FIG. 11 shows a case where a non-interleaving block group exists among target memory blocks. Description overlapping with that of FIG. 10 is omitted.

When the non-interleaving block group exists among the target memory blocks, instructions corresponding to the memory blocks included in the non-interleaving block group may be separately configured. In FIG. 11, as an example, a case where the memory blocks in the Die 1 is a non-interleaving block group is shown.

The instruction set may include instructions 1-1, 1-2, 1-3, 5-1, 5-2, and 5-3 corresponding to a first syntax (Data In/pDATA(1-2)/Die 1/SB1) of the descriptor, instructions 2 and 6 corresponding to a second syntax (Tprog/Die 1) of the descriptor, instructions 3-1, 3-2, and 3-3 corresponding to a third syntax (Data In/pDATA(3-4)/Die 2/SB1) of the descriptor, and an instruction 4 corresponding to a fourth syntax (Tprog/Die 2/ITR) of the descriptor. The instruction 4 positioned in the middle of the instructions in the instruction set may include information (ITR) indicating to generate the interrupt when performance of the instruction 4 is completed, as described in the descriptor.

A command CMD1, an address ADD1, and data DATA 1 may be transmitted to the Die 1 according to the instructions 1-1, 1-2, and 1-3, and the standby operation may be performed until the program operation on the data DATA 1 is completed in the Die 1.

Similarly, a command CMD2, an address ADD3-4 and data DATA 3-4 may be transmitted to the Die 2 according to the instructions 3-1, 3-2, and 3-3, and the standby operation may be performed until the program operation on the data DATA 3-4 is completed in the Die 2.

Similarly, a command CMD3, an address ADD2 and data DATA 2 may be transmitted to the Die 1 according to the instructions 5-1, 5-2, and 5-3, and the standby operation may be performed until the program operation on the data DATA 2 is completed in the Die 1.

Since the instruction set includes the information ITR indicating to generate the interrupt when the performance of the instruction 4 is completed, the interrupt occurs when the program operation on the data DATA 3-4 is completed. Accordingly, the program data may be erased from the buffer memory.

However, when the performance of the instruction 4 is completed, completion of the instructions 5-1, 5-2, 5-3, and 6 may not be ensured. For example, the performance of the instruction 4 may be completed in a state in which the data DATA 2 is not transmitted to the Die 1 or the program operation on the data DATA 2 is not completed. That is, the interrupt may occur in a state in which the data DATA 2 is not transmitted to the Die 1 or the program operation on the data DATA 2 is not completed. Therefore, a problem may arise in which the program data stored in the buffer memory is erased in a state in which the data DATA 2 is not transmitted or the program data stored in the buffer memory is erased in a state in which the program operation on the data DATA 2 fails, and thus retransmission of the data DATA 2 is required.

Figure 12:
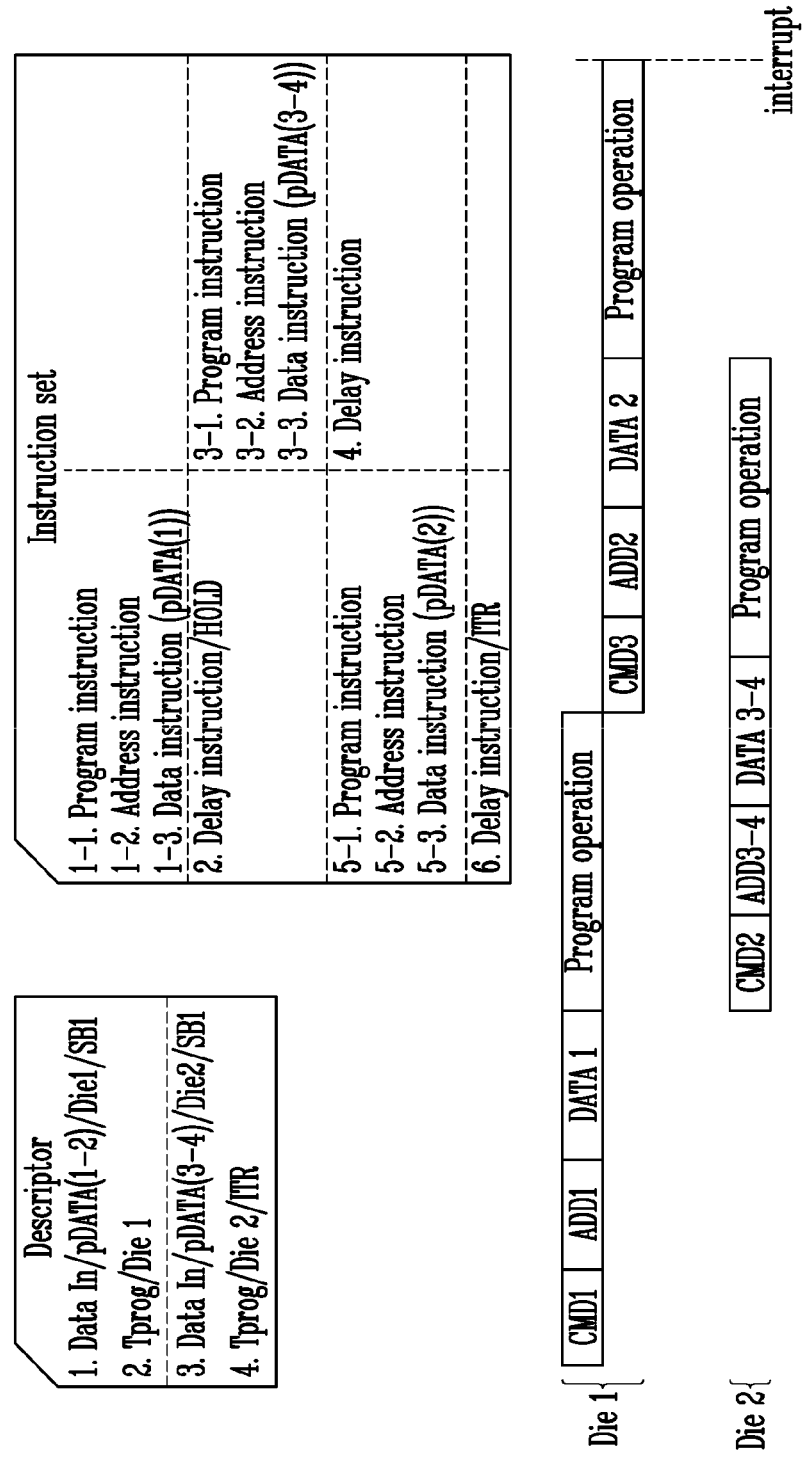

FIG. 12 is a diagram illustrating an exemplary instruction set.

FIG. 12 shows a case where a non-interleaving block group exists among the target memory blocks. Description overlapping that of FIG. 11 is omitted.

When the non-interleaving block group exists among the target memory blocks, instructions corresponding to the memory blocks in the non-interleaving block group may be separately configured. In FIG. 12, as an example, a case where the memory blocks included in the Die 1 is a non-interleaving block group is shown.

The instruction set may include instructions 1-1, 1-2, 1-3, 5-1, 5-2, and 5-3 corresponding to a first syntax (Data In/pDATA(1-2)/Die 1/SB1) of the descriptor, instructions 2 and 6 corresponding to a second syntax (Tprog/Die 1) of the descriptor, instructions 3-1, 3-2, and 3-3 corresponding to a third syntax (Data In/pDATA(3-4)/Die 2/SB1) of the descriptor, and an instruction 4 corresponding to a fourth syntax (Tprog/Die 2/ITR) of the descriptor.

In contrast to the embodiment of FIG. 11, in the embodiment of FIG. 12, the instruction 6 positioned at the end of the instructions in the instruction set may include information indicating to generate an interrupt when performance of the instruction 6 is completed. In addition, the instruction 4 corresponding to the fourth syntax (Tprog/Die 2/ITR) of the descriptor may not include the information indicating to generate the interrupt when the performance of the instruction 4 is completed.

Similarly to the embodiment described with reference to FIG. 11, in the embodiment of FIG. 12, the instructions 1-1, 1-2, 1-3, the instruction 2, the instructions 3-1, 3-2, and 3-3, the instruction 4, the instructions 5-1, 5-2, and 5-3 and the instruction 6 may be sequentially performed.

Since the instruction set includes the information ITR indicating to generate the interrupt when the performance of the instruction 6 is completed, the interrupt occurs when the program operation on the data DATA 2 is completed. Accordingly, the program data may be erased from the buffer memory. That is, according to the embodiment shown in FIG. 12, all work items described in the descriptor may be successfully completed.

Among the instructions corresponding to the Die 1, the instruction 2 may include information (HOLD) for prohibiting access to the Die 1 by an instruction in an instruction set other than the instruction set that is currently being performed. Therefore, data other than the data DATA 2 may be prevented from being transmitted to the Die 1 before the performance of the instructions 5-1, 5-2, 5-3, 6 is completed.

Figure 13:
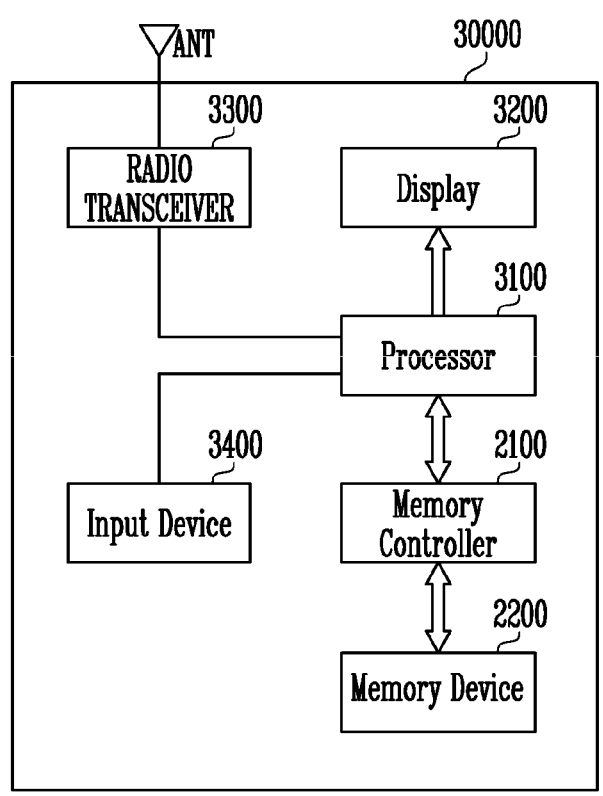
FIGS. 13 to 16 are diagrams illustrating another example of the memory system including the memory controller shown in FIGS. 1 and 8.

FIG. 13 is a diagram illustrating another example of the memory system including the memory controller shown in FIGS. 1 and 8.

Referring to FIG. 13, the memory system 30000 may be implemented as a cellular phone, a smart phone, a tablet, a personal computer (PC), a personal digital assistant (PDA), or a wireless communication device. The memory system 30000 may include the memory device 2200 and the memory controller 2100 capable of controlling the operation of the memory device 2200.

The memory controller 2100 may control a data access operation, for example, a program operation, an erase operation, a read operation, or the like, of the memory device 2200 under control of a processor 3100.

Data programmed in the memory device 2200 may be output through a display 3200 under the control of the memory controller 2100.

A radio transceiver 3300 may transmit and receive a radio signal through an antenna ANT. For example, the radio transceiver 3300 may convert a radio signal received through the antenna ANT into a signal that may be processed by the processor 3100. Therefore, the processor 3100 may process the signal output from the radio transceiver 3300 and transmit the processed signal to the memory controller 2100 or the display 3200. The memory controller 2100 may transmit the signal processed by the processor 3100 to the memory device 2200. In addition, the radio transceiver 3300 may convert a signal output from the processor 3100 into a radio signal, and output the radio signal to an external device through the antenna ANT. An input device 3400 may be a device capable of inputting a control signal for controlling the operation of the processor 3100 or data to be processed by the processor 3100. The input device 3400 may be implemented as a pointing device such as a touch pad or a computer mouse, a keypad, or a keyboard. The processor 3100 may control an operation of the display 3200 so that data output from the memory controller 2100, data output from the radio transceiver 3300, or data output from the input device 3400 is output through the display 3200.

According to an embodiment, the memory controller 2100 capable of controlling the operation of memory device 2200 may be implemented as a part of the processor 3100 and may be implemented as a chip separate from the processor 3100.

Figure 14:
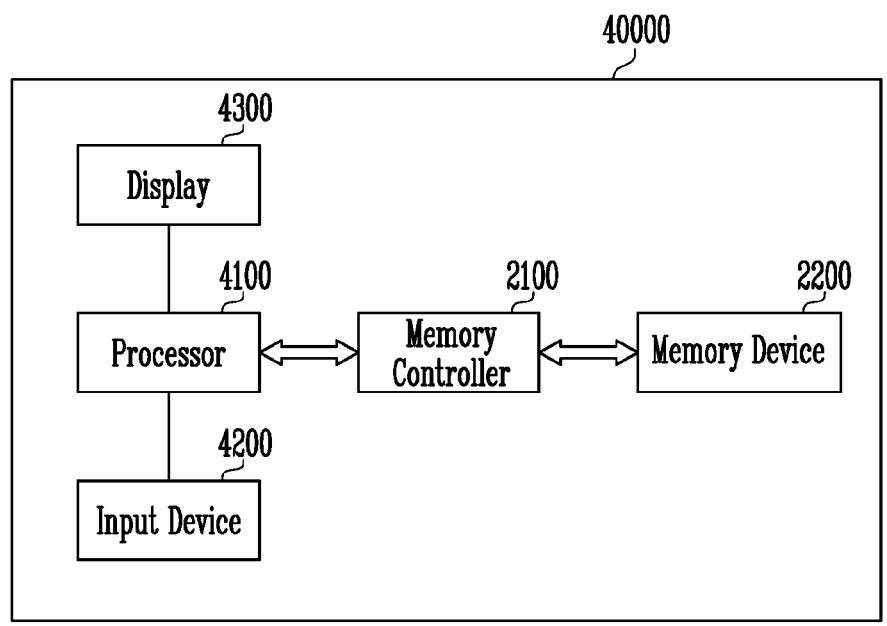

FIG. 14 is a diagram illustrating another example of the memory system including the memory controller shown in FIGS. 1 and 8.

Referring to FIG. 14, the memory system 40000 may be implemented as a personal computer (PC), a tablet, a netbook, an e-reader, a personal digital assistant (PDA), a portable multimedia player (PMP), an MP3 player, or an MP4 player.

The memory system 40000 may include the memory device 2200 and the memory controller 2100 capable of controlling a data process operation of the memory device 2200.

A processor 4100 may output data stored in the memory device 2200 through a display 4300, according to data input through an input device 4200. For example, the input device 4200 may be implemented as a point device such as a touch pad or a computer mouse, a keypad, or a keyboard.

The processor 4100 may control the overall operation of the memory system 40000 and control the operation of the memory controller 2100. According to an embodiment, the memory controller 2100 capable of controlling the operation of memory device 2200 may be implemented as a part of the processor 4100 or may be implemented as a chip separate from the processor 4100.

Figure 15:
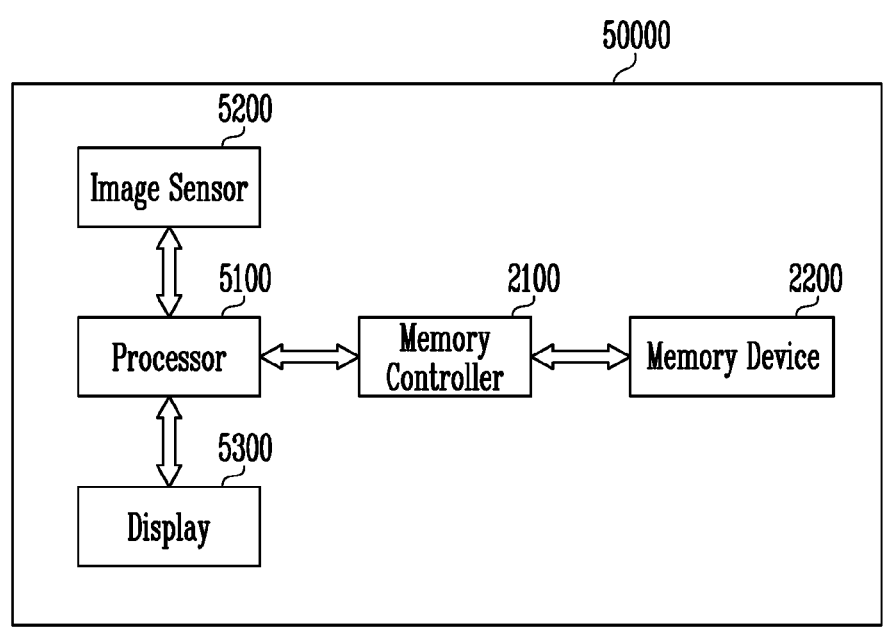

FIG. 15 is a diagram illustrating another example of the memory system including the memory controller shown in FIGS. 1 and 8.

Referring to FIG. 15, the memory system 50000 may be implemented as an image processing device, for example, a digital camera, a portable phone provided with a digital camera, a smart phone provided with a digital camera, or a tablet provided with a digital camera.

The memory system 50000 includes the memory device 2200 and the memory controller 2100 capable of controlling a data process operation, for example, a program operation, an erase operation, or a read operation, of the memory device 2200.

An image sensor 5200 of the memory system 50000 may convert an optical image into digital signals. The converted digital signals may be transmitted to a processor 5100 or the memory controller 2100. Under control of the processor 5100, the converted digital signals may be output through a display 5300 or stored in the memory device 2200 through the memory controller 2100. In addition, data stored in the memory device 2200 may be output through the display 5300 under the control of the processor 5100 or the memory controller 2100.

According to an embodiment, the memory controller 2100 capable of controlling the operation of memory device 2200 may be implemented as a part of the processor 5100 or may be implemented as a chip separate from the processor 5100.

Figure 16:
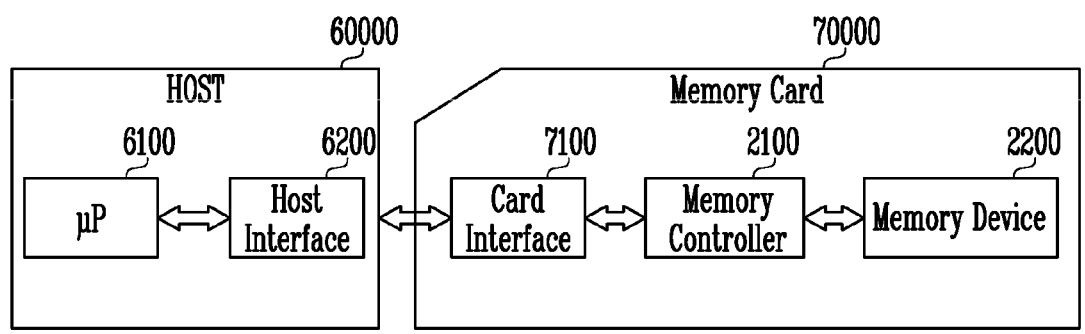

FIG. 16 is a diagram illustrating another example of the memory system including the memory controller shown in FIGS. 1 and 8.

Referring to FIG. 16, the memory system 70000 may be implemented as a memory card or a smart card. The memory system 70000 may include the memory device 2200, the memory controller 2100, and a card interface 7100.

The memory controller 2100 may control data exchange between the memory device 2200 and the card interface 7100. According to an embodiment, the card interface 7100 may be a secure digital (SD) card interface or a multi-media card (MMC) interface, but is not limited thereto.

The card interface 7100 may interface data exchange between a host 60000 and the memory controller 2100 according to a protocol of the host 60000. According to an embodiment, the card interface 7100 may support a universal serial bus (USB) protocol, and an interchip (IC)-USB protocol. Here, the card interface 7100 may refer to hardware capable of supporting a protocol that is used by the host 60000, software installed in the hardware, or a signal transmission method.

When the memory system 70000 is connected to a host interface 6200 of the host 60000 such as a PC, a tablet, a digital camera, a digital audio player, a mobile phone, a console video game hardware, or a digital set-top box, the host interface 6200 may perform data communication with the memory device 2200 through the card interface 7100 and the memory controller 2100 under control of a microprocessor 6100.

While embodiments of the present invention have been illustrated and described, the present invention is not limited to the disclosed embodiments nor to any specific details in the description. As those skilled in the art will appreciate in light of the present disclosure, various modifications may be made to any of the disclosed embodiments that still fall within the scope of the present invention. Thus, the present invention encompasses all modifications and variations that fall within the scope of the claims.

What is claimed is:

1. A memory controller for controlling a memory device including a first die and a second die, the memory controller comprising:
    a buffer memory configured to store program data to be stored in a super block including at least one memory block selected from each of the first die and the second die;
    a memory interface configured to generate an instruction set describing a procedure for storing the program data stored in the buffer memory to the super block and to control the memory device to store the program data in the super block by executing the instruction set, wherein the procedure includes a first program operation for the first die, a second program operation for the second die, and a third program operation for the first die which are sequentially executed; and
    a central processing unit configured to execute the instruction set and to discard the program data stored in the buffer memory when an interrupt occurs while the instruction set is executed,
    wherein the memory interface sequentially generates first instructions related to the first program operation, second instructions related to the second program operation, and third instructions related to the third program operation,
    wherein, when the super block includes a non-interleaving block group, the memory interface generates the first instructions to include hold information, the second instructions to include delay information and not include interrupt information in response to the hold information, and the third instructions to include the interrupt information which initiates the interrupt when the instruction set is being executed, and
    wherein, when the non-interleaving block group is not included in the super block, the memory interface separately configures first instructions corresponding to a first interleaving block group in the super block and second instructions corresponding to a second interleaving block group in the super block.

* * * * *